April 7, 1970  S. T. DUEKER  3,504,758
ACOUSTIC WELL-LOGGING APPARATUS
Filed Feb. 19, 1969
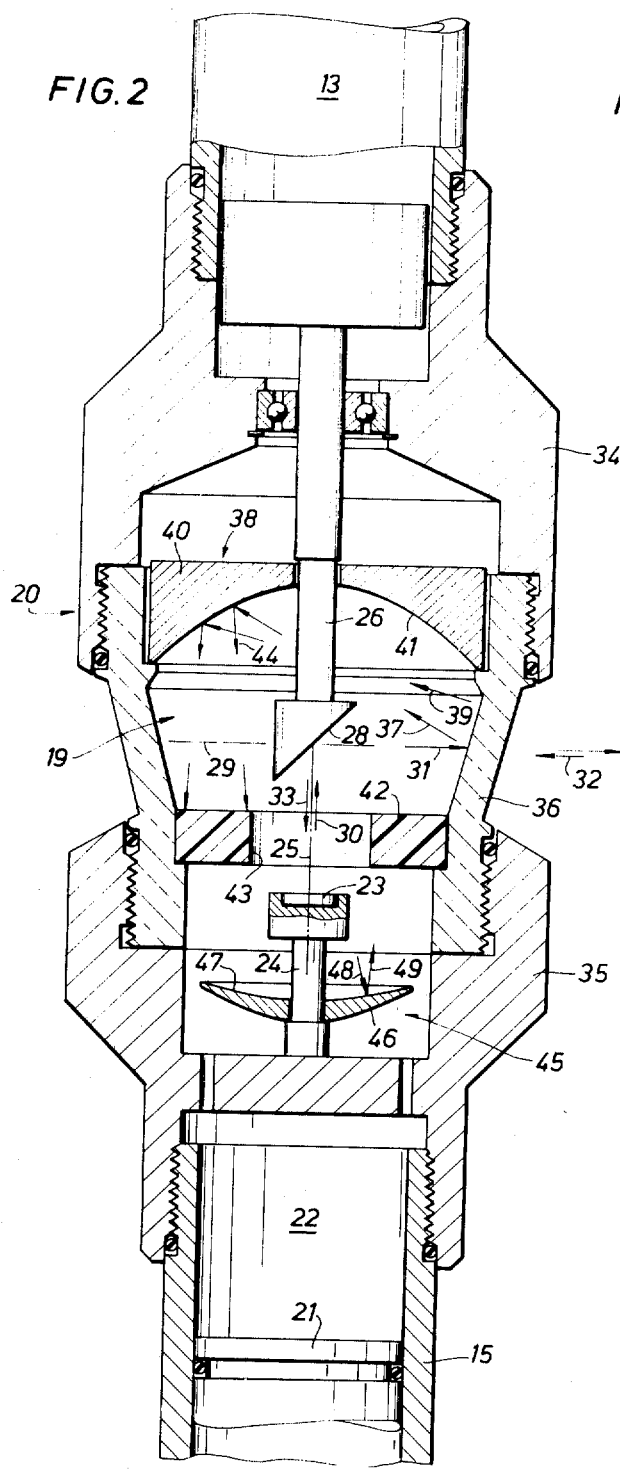
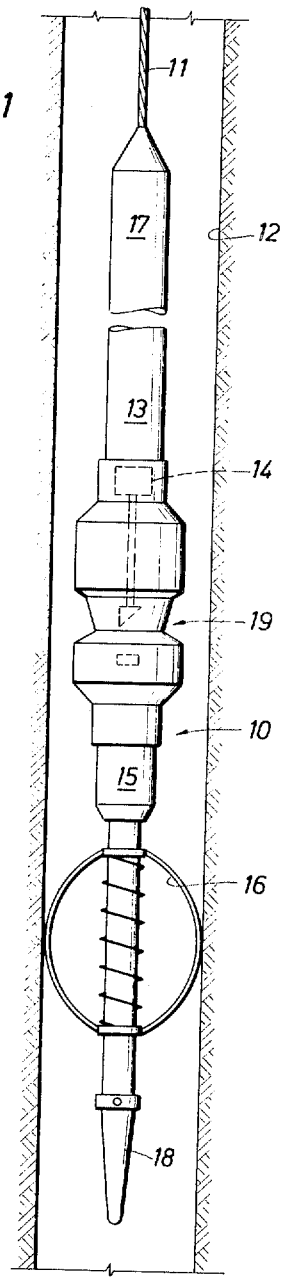
Stanley T. Dueker
INVENTOR
BY *J. R. Archambeau Jr.*
ATTORNEY

United States Patent Office 3,504,758
Patented Apr. 7, 1970

3,504,758
ACOUSTIC WELL-LOGGING APPARATUS
Stanley T. Dueker, Houston, Tex., assignor to Schlumberger Technology Corporation, New York, N.Y., a corporation of Texas
Filed Feb. 19, 1969, Ser. No. 800,685
Int. Cl. G01v 1/00
U.S. Cl. 181—.5                                     9 Claims

ABSTRACT OF THE DISCLOSURE

As a preferred embodiment of the invention disclosed herein, acoustic transducer means are fixed in a well tool housing for operation along a selected generally-longitudinal axis. An acoustic-energy reflector is rotatably mounted within a portion of the housing having an upright wall through which acoustic energy can be passed laterally, with the reflector facing the transducer means and operatively inclined across the aforesaid operating axis to redirect acoustic energy passing to and from the transducer means. Accordingly, upon rotation of the reflector, acoustic energy is efficiently directed between the transducer means and the perimeter of a borehole surrounding the housing. To at least minimize extraneous signals or interference from spurious or misdirected acoustic energy, one or more particularly-shaped reflectors are operatively arranged in relation to the transducer and rotating reflector for deflecting such misdirected acoustic energy toward suitable energy-absorbing means.

---

Recent advances in techniques for investigating well bores have resulted in the development of acoustic-logging apparatus for providing visual displays of the wall surfaces of a well bore. In general, such apparatus includes a cable-suspended well tool in which directional acoustic-transducer means are rotated about the axis of the well bore. By progressively sweeping repetitively-emitted high-frequency acoustic signals around the circumference of the well bore wall, corresponding reflected signals will be obtained which will vary in accordance with various characteristics of the scanned well bore wall. Thus, as the tool is moved along a well bore, these reflected acoustic signals are appropriately converted to derive a record which is indicative of the characteristics of the successively-scanned portions of the well bore wall. Such records are, of course, particularly useful for indicating the presence of anomalies in a well bore well as well as variations in the nature of the formation material surrounding the well bore. In fact, present-day logging apparatus of this nature is capable of producing visual displays having sufficient resolution to portray even such minor anomalies as formation fractures in a borehole wall or perforations in a well casing.

It will, of course, be appreciated that the accuracy of these visual records is directly related to the quality of the reflected acoustic energy received by the transducer means and subsequently transformed into electrical signals. If, for example, either spurious acoustic energy is added to the reflected acoustic energy being received or extraneous electrical noise is induced in the derived electrical signals as by slip rings or the like, the quality of the resulting visual display will be significantly affected.

Accordingly, it is an object of the present invention to provide signal-directing means for rotating a laterally-directed beam of acoustic energy and receiving reflected energy derived therefrom without inducing extraneous or spurious signals or otherwise unduly affecting the quality of electrical signals passing to and from the related signal circuitry.

This and other objects of the present invention are attained by operatively mounting on a support adapted for passage through a well bore new and improved signal-directing means including acoustic-transducer means that are fixed for operation along a selected generally-longitudinal axis to eliminate the need for moving signal-coupling connections to the transducer means. An inclined acoustic-energy reflector facing the transducer means is mounted adjacent thereto for selective rotation about the axis of operation. The signal-directing means further include one or more particularly-shaped acoustic reflectors that are operatively arranged in relation to the transducer and rotating reflector to deflect misdirected or spurious acoustic energy toward energy-absorbing means.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIGURE 1 illustrates a typical acoustic logging tool arranged in accordance with the principles of the present invention; and FIGURE 2 is an enlarged view of the central section of the logging tool depicted in FIGURE 1 and partially cross-sectioned to show a preferred embodiment of the present invention.

Turning now to FIGURE 1, an acoustic logging tool 10 is shown suspended from a suitable cable 11 within a borehole 12. As is typical, the logging tool 10 comprises an elongated support or body which is conveniently arranged as a number of tandemly-connected housing sections which preferably include an intermediate section 13 enclosing a selectively-operable motor 14 and a lower housing section 15 carrying a centralizer 16 for maintaining the tool concentrically disposed in the borehole 12. In some instances, one or more centralizers (not shown) may also be mounted, as on an upper housing section 17, near the upper end of the tool 10. To absorb the shocks resulting upon striking obstructions as the tool is being lowered into the borehole 12, a resilient nose piece 18 is preferably mounted on the lower end of the housing section 15.

Inasmuch as the present invention is particularly directed to the new and improved signal-directing means 19 of the acoustic-logging tool 10, the specific details of the electrical circuitry employed in the tool and at the surface are, therefore, of no particular significance in fully understanding the invention. Thus, it is sufficient to say only that a preferred embodiment of the signal circuitry for the tool 10 is fully described in a copending application, Ser. No. 697,796, filed Jan. 15, 1968.

As will be subsequently explained in more detail, the signal-directing means 19 are adapted to progressively rotate a laterally-directed beam of acoustic energy about the vertical axis of the tool 10 upon operation of the motor 14. By arranging the signal-directing means 19 of the present invention within a housing section 20 having an upright peripheral wall of a material through which high-frequency acoustic energy can pass with relative freedom, the adjacent wall surfaces of the borehole 12 will be progressively subjected to repetitive bursts of radially-directed high-frequency acoustic energy at a selected frequency between 500-kilocycles and 5-megacycles.

As these outwardly-directed bursts progressively scan the circumference of the borehole 12, the resulting reflections of acoustic energy (which are, of course, influenced by the composition or character of the borehole wall) that are being received will develop corresponding electrical signals. By means of the electrical circuitry, these electrical signals produce a continuous record or visual display on an image-reproducing device, such as an oscilloscope, included with the circuitry at the surface. The electrical circuitry also preferably includes appropriate means for presenting at the surface depth-correlation information as well as progressive indications of the angular or azimuthal positions of the rotating beam of acoustic energy. As a result, the resulting visual record provided by the logging tool 10 will present a fairly-representing picture of the well bore wall which has sufficient resolution for location even small defects such as fractures or casing perforations. Moreover, by virtue of the correlative depth and azimuth information, the position in the well bore of any anomalies shown on the visual record can be accurately determined.

Turning now to FIGURE 2, a detailed view is shown of the housing section 20 in which is located a preferred embodiment of the signal-directing means 19 of the present invention. The housing section 20 is tandemly coupled between the adjacent housing sections 13 and 15 and fluidly sealed to exclude dirty well bore fluids from the interior of the logging tool 10. A typical pressure-compensating piston 21 is slidably disposed in the lower housing section 15 and the interior spaces 22 of the housing sections thereabove are filled with a suitable oil or such (not shown). Thus, by admitting well bore fluids into the lower portion of the housing section 15, the piston 21 will maintain the oil in the spaces 22 above the piston at the hydrostatic pressure of the well bore fluids as well as accommodate volumetric changes caused by temperature variations of the oil.

In the preferred manner of arranging the signal-directing means 19, a typical high-frequency transducer, such as a piezoelectric crystals 23, is mounted on the upper end of an upright pedestal or axial support 24 secured within the housing section 20 and faced upwardly with its operating axis 25 coincidentally aligned with the longitudinal axis of the housing section 20. The motor 14 is appropriately mounted thereabove in an inverted position within the housing section 13 and operatively coupled to an axially-aligned shaft 26 of a sound-absorbing material that is extended downwardly from the motor into the housing section 20. A signal reflector 27 having a downwardly-facing, inclined flat face 28 is dependently mounted on the lower end of the shaft 26 and appropriately arranged for rotation thereby in a transverse plane 29 that, preferably, perpendicularly intersects the operating axis 25.

It will be recognized, of course, that since the angle of incidence always equals the angle of reflection, by inclining the downwardly-faced reflective surface 28 at an angle of 45° in relation to both the axis 25 and the plane 29 the signal-directing means 19 of the present invention will redirect acoustic energy at an angle of 90°. Accordingly, upon emission of an acoustic signal (as at 30) from the transducer 23, this signal will be directed upwardly parallel to or along the operating axis 25 and, upon meeting the reflective face 28, be redirected outwardly (as at 31) along or parallel to the lateral plane 29 in a radial direction corresponding to the immediate angular position of the reflector body 27. Conversely, any acoustic energy returning inwardly (as at 32) along or parallel to the lateral plane 29 and striking the reflective surface 28 will be redirected downwardly (as at 33) parallel to or along the operating axis 25 toward the transducer 23.

The previously-described electrical circuitry is, therefore, arranged to cyclically energize the crystal 23 to produce repetitive outwardly-directed bursts of acoustic energy (as at 31) as well as to alternately use the crystal for receiving the inwardly-directed reflections (as at 32) from the well bore wall resulting from each burst before the next burst is transmitted. Thus, by means of appropriate sequencing circuitry, the signal-directing means 19 of the invention alternately transmit and receive radially-directed acoustic energy to produce the previously-described visual record.

In general, the intermediate housing 20 is comprised of upper and lower axially-aligned sections 34 and 35 tandemly connected to the opposite ends of a unique intermediate tubular section 36. Although this intermediate section 36 of the housing 20 is sufficiently rugged for well bore service, the section has a continuous circumferential wall portion through which laterally-directed acoustic energy can be efficiently passed in any angular direction. Since acoustic energy must be passed through the tubular member 36, this member must, therefore, be of a material which will not materially affect this energy. Of equal importance, of course, the physical properties of the selected composition employed for the member 36 must be sufficient to withstand the adverse conditions typically found in a well bore.

Accordingly, since none of the usual relatively-strong plastic materials are of practical use for enclosing acoustic transducers operating at frequencies in the order of 500-kilocycles or higher as do the transducer means 23 in the logging tool 10, a plastic composition which meets the stringent requirements for the housing member 36 is an aromatic polyimide-resin plastic material presently marketed, for example, by E. I. du Pont de Nemours & Co. under the trademark of Vespel. In particular, the selected grade of Vespel is presently designated by Du Pont as "SP–1" which is described in their Bulletin A–43721 as being formed from the unmodified or base polyimide resin instead of having any one of several listed additive materials.

Particular care must, of course, be taken to prevent the outwardly-directed bursts of acoustic energy from reflecting back from the plastic member 36 onto the reflector 27 and interfering with the reception of acoustic signals (as at 32) returning from the well bore walls. For example, although the distance from the reflector 27 to the inner surface of the acoustic window 36 is less than the distance to the well bore wall, a reflection (as at 37) from the final portion of an outwardly-transmitted burst could possibly arrive at the reflector at about the same time that the first portion of the reflected wave (as at 32) from the well bore wall is arriving. Accordingly, to prevent these reflections from the outwardly-directed bursts from returning directly back onto the reflector 27, the plastic window is arranged as a frusto-conical tubular member uniformly disposed about the vertical axis of the tool 10 and having its wall inclined upwardly and outwardly at a slight angle in relation to the vertical axis. It has been found that the optimum inclination here is about 15° from the vertical, with about 20° being the greatest permissible inclination. Tests have shown that inclination greater than about 20° result in an excessive percentage of the acoustic energy being reflected.

Accordingly, as another aspect of the signal-directing means 19, energy-attenuating means 38 are uniquely arranged as depicted in FIGURE 2 in the housing section 20 to prevent spurious or misdirected acoustic energy from reaching the transducer crystal 23. In general, therefore, the energy-attenuating means 38 are adapted to attenuate misdirected acoustic energy (as at 37 and 39) by redirecting this energy to suitable energy-absorbing elements. In the preferred manner of accomplishing this, the energy-attenuating means 38 include an annular reflector 40 mounted transversely across the upper portion of the housing section 20 around the motor shaft 26 and above the reflector 27. The lower end of this reflecting body 39 is uniquely shaped to define a concave acoustic-energy reflecting surface 41 that is concentrically disposed in relation to the central axis 25 and faced toward the crystal 23. In addition, the energy-attenuating means 38 further include an annular sound-absorbing body 42 that is coaxially mounted in the intermediate portion of the housing section 20 between the reflector 27 and crystal 23. To enhance the attenuation properties of the annular body 42, it is preferred that the body be formed of some sound-absorbing material as lead, rubber, or various elastomers as well as such open-celled materials as sintered metals or plastics. It should, of course, be understood that the axial bore 43 through the annular body 42 is appropriately sized so as to permit the free passage of longitudinally-directed acoustic energy between the reflector 27 and crystal 23.

It will be appreciated, therefore, that whatever acoustic energy (as at 37) that is reflected from the acoustic window 36 will be diverted upwardly toward the concave reflective surface 41 on the opposite side of the housing section 20. Thus, once this spurious energy (as at 37 or 39) meets the curved wall 41, a portion of the energy will be absorbed therein with the remainder of this energy being redirected downwardly (as at 44) toward the energy-absorbing body 42. Accordingly, by cooperatively shaping the downwardly-facing surface 41 of the energy-attenuating means 38 to redirect spurious acoustic energy entering the housing 20, the spurious or misdirected energy will be efficiently dissipated so as to not interfere with the operation of the logging tool 10. It will, of course, be recognized from FIGURE 2 that the curvature of the reflecting surface 41 is also cooperatively arranged in relation to the inclination of the acoustic window 36 so as to efficiently redirect misdirected or spurious acoustic energy entering from outside of the window into the absorbing body 41.

Although the major source of spurious acoustic energy in the housing section 20 will be from reflections against the window 36 of outwardly-directed acoustic signals (as 37), it has also been found on occasion that misdirected returning acoustic energy can pass downwardly alongside the transducer 23. Moreover, spurious energy can be emitted rearwardly from the crystal 23 when it is transmitting a signal. Thus, for the same reasons as discussed above, energy-attenuating means 45 are also preferably provided in the lower portion of the housing section 20 below the crystal 23 to eliminate interference from such spurious signals. Accordingly, as depicted in FIGURE 2, the lower energy-attenuating means 45 includes a coaxially-mounted, transverse annular member 46 having an upwardly-facing concave wall 47 around the pedestal 24. By forming the pedestal 24 and lower member 46 of sound-absorbing materials, a misdirected or spurious signal (as at 48) will be attenuated as it is redirected (as at 49) upwardly into either the pedestal 24 or the lower face of the absorber member 42. It should be recognized, however, that as far as the purposes of the present invention are concerned, the surface 47 could also be either flat or convex so long as a redirected signal therefrom will meet either the absorber member 42 or the pedestal 24.

Thus, in the operation of the logging tool 10, it will be recognized that inwardly and outwardly-directed acoustic signals will be efficiently passed between the transducer 23 and the adjacent walls of the well bore as at 12. By rigidly mounting the transducer 23, suitable electrical connections can be made thereto without presenting a possible source of interference to the signals passing to and from the electrical circuitry. Moreover, the present invention has also provided means for reliably eliminating interference from spurious or misdirected acoustic signals. Thus, although changes and modifications can be made in the principles of the invention, the unique signal-directing and energy-attenuating means of the present invention will neither introduce undesirable noise into signals passing to and from the electrical circuitry nor allow unwanted acoustic energy to interfere with these signals.

What is claimed is:

1. Acoustic-logging apparatus adapted for suspension in a well bore and comprising: a support including a tubular enclosure coaxially arranged thereon and having an upright wall through which acoustic energy can be passed laterally; acoustic-transducer means on said support and adapted for operation along a selected axis within said tubular enclosure and intersecting a selected position within the confines of said wall; an acoustic-signal reflector having an inclined reflective surface operatively arranged for rotation about said selected position for selectively redirecting acoustic signals between said operational axis and selected lateral axes respectively extending outwardly from said selected position at corresponding angular orientations of said inclined surface and respectively intersecting said wall at a selected first angle of incidence in relation thereto for directing reflections from said wall away from said signal reflector; and means for attenuating such reflections of outwardly-directed acoustic signals returning inwardly from said wall and including an annular body of a sound-absorbing material coaxially mounted within said tubular enclosure around said operational axis, and an annular reflector coaxially mounted around said wall and having an inwardly-directed face operatively inclined at a selected second angle of incidence in relation to the axis of such reflections returning from said wall for redirecting such reflections toward said sound-absorbing body.

2. The acoustic-logging apparatus of claim 1 wherein said annular reflector is composed of sound-absorbing materials.

3. The acoustic-logging apparatus of claim 1 wherein said angle of incidence of said lateral axes with said wall is no greater than about 15° to 20°.

4. The acoustic-logging apparatus of claim 1 wherein said upright wall is frusto-conically shaped with the angle of inclination thereof being no greater than about 15° to 20° from the vertical and said lateral axes are substantially horizontal to limit said first angle of incidence thereof with said wall to an angle no greater than about 15° to 20°.

5. Acoustic-logging apparatus adapted for suspension in a well bore and comprising: a support including a tubular enclosure coaxially arranged thereon and having a frusto-conical section of a material through which high-frequency acoustic energy can be passed; acoustic-transducer means adapted to operate at a frequency of at least about 500-kilocycles mounted on said support adjacent to the smaller end of said frusto-conical section and adapted for operation along the longitudinal axis thereof; an acoustic-signal reflector operatively arranged for rotation about said longitudinal axis, said signal reflector having an inclined reflective face facing said transducer means and intersecting said longitudinal axis at an angle of about 45° for selectively redirecting acoustic signals between said longitudinal axis and selected radial axes respectively corresponding to the angular orientation of said reflective face upon rotation of said signal reflector and lying in a horizontal plane intersecting said frusto-conical section at a selected angle of incidence for directing reflections of outwardly-directed acoustic signals rebounding from said frusto-conical section away from said signal reflector; and means for attenuating such reflections rebounding from said frusto-conical section arranged adjacent to the larger end of said frusto-conical section and including an annular body of a sound-absorbing material coaxially mounted adjacent to said smaller end of said frusto-conical section, and an annular reflector coaxially arranged in said enclosure adjacent to said larger end of said frusto-conical section and having an inwardly-directed curved surface for redirecting such reflections toward said annular sound-absorbing body.

6. The acoustic-logging apparatus of claim 5 wherein said annular reflector is of a sound-absorbing material.

7. The acoustic-logging apparatus of claim 5 wherein said annular sound-absorbing body is between said transducer means and said signal reflector.

8. The acoustic-logging apparatus of claim 5 wherein said annular sound-absorbing body is between said transducer means and said signal reflector and further including energy-attenuating means around said transducer means and to the rear of said annular sound-absorbing body, said energy-attenuating means including a second annular reflector coaxially mounted around and to the rear of said transducer means and having a reflective face facing the rear of said annular sound-absorbing body for directing acoustic energy meeting said second annular reflector toward the rear of said annular sound-absorbing body.

9. The acoustic-logging apparatus of claim 8 wherein said second annular reflector is of a sound-absorbing material.

References Cited

UNITED STATES PATENTS 2,825,044  2/1958  Peterson _____ 181—0.5

RODNEY D. BENNETT, Jr., Primary Examiner

C. E. WANDS, Assistant Examiner